United States Patent [19]
Kormos

[11] Patent Number: 5,781,243
[45] Date of Patent: Jul. 14, 1998

[54] DISPLAY OPTIMIZATION FOR NIGHT VISION ENHANCEMENT SYSTEMS

[75] Inventor: Alex L. Kormos, Los Angeles, Calif.

[73] Assignee: Hughes Electronics, Los Angeles, Calif.

[21] Appl. No.: 438,135

[22] Filed: May 8, 1995

[51] Int. Cl.⁶ .............................. H04N 5/46; H04N 5/33
[52] U.S. Cl. ...................... 348/556; 348/39; 348/164; 348/148
[58] Field of Search ...................... 348/556, 39, 135, 348/136, 137, 140, 141, 169, 170, 164, 168, 36, 113, 148, 581, 704; H04N 5/46

[56] References Cited

U.S. PATENT DOCUMENTS

| | | | |
|---|---|---|---|
| 3,705,328 | 12/1972 | Torok | 315/26 |
| 4,347,530 | 8/1982 | Stetson | 358/113 |
| 4,786,966 | 11/1988 | Hanson et al. | 358/108 |
| 5,065,024 | 11/1991 | McCullough | 250/334 |
| 5,150,213 | 9/1992 | Kellar et al. | 358/16 |
| 5,530,642 | 6/1996 | Lofthus et al. | 364/174 |
| 5,572,033 | 11/1996 | Grant | 250/353 |

FOREIGN PATENT DOCUMENTS

| | | | |
|---|---|---|---|
| 0533092A | 3/1993 | European Pat. Off. | H04N 5/76 |
| 0596729A | 5/1994 | European Pat. Off. | G02B 17/00 |
| 2259211 | 3/1997 | United Kingdom | H04N 5/33 |

*Primary Examiner*—John K. Peng
*Assistant Examiner*—Linus H. Lo
*Attorney, Agent, or Firm*—Gordon R. Lindeen, III; Michael W. Sales; Wanda K. Denson-Low

[57] ABSTRACT

Night vision apparatus including an infrared night vision sensor having a selected field of view and a display panel positioned for displaying an image detected by the sensor, the display panel having a display aspect ratio optimized based upon the horizontal dimension of the field of view of the infrared sensor such that the display aspect ratio decreases as the horizontal field of view narrows.

13 Claims, 2 Drawing Sheets

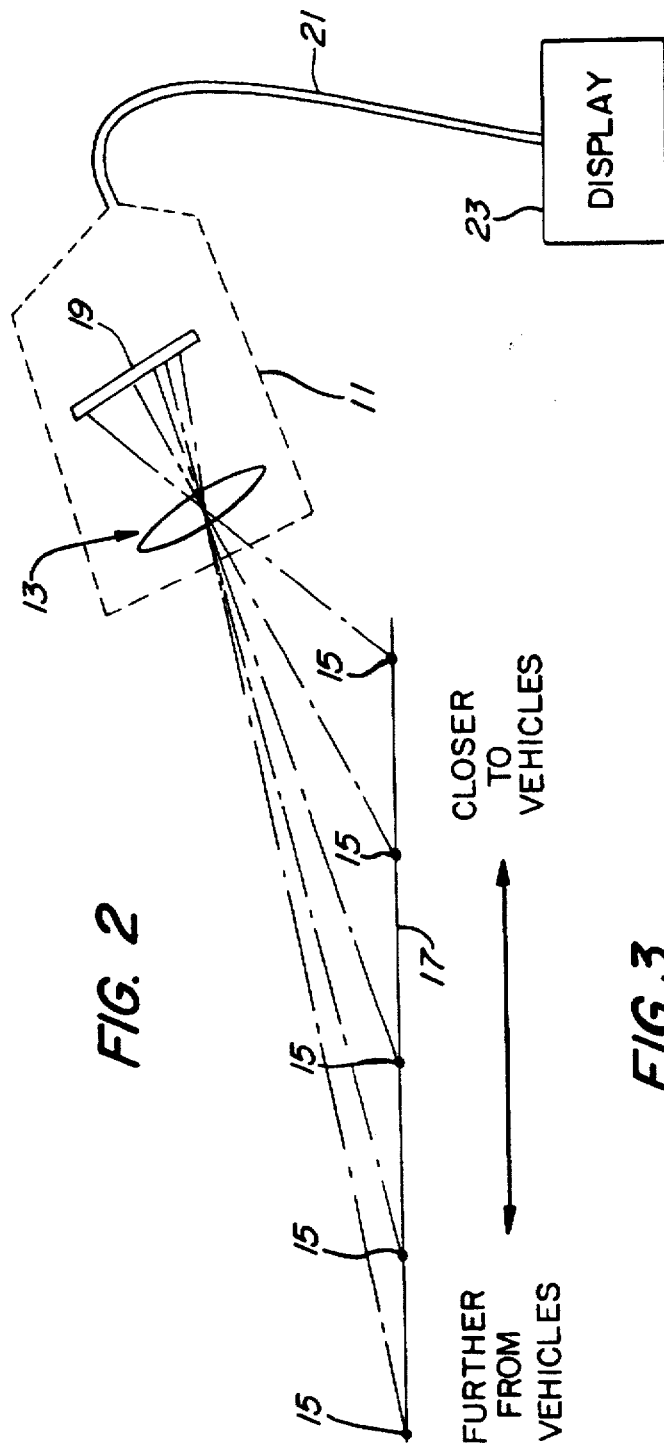
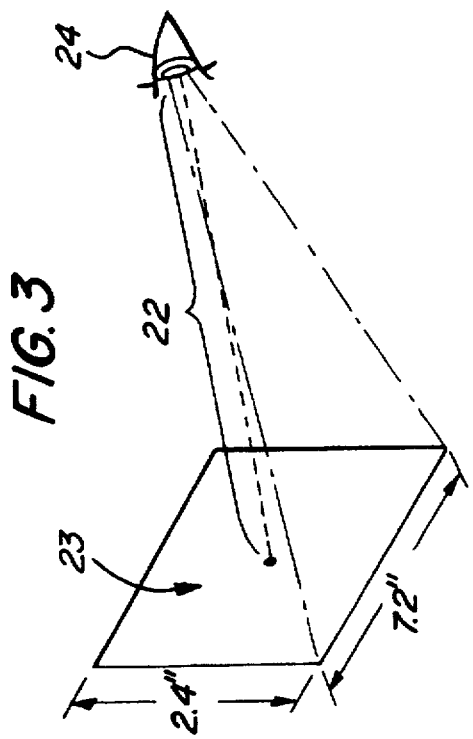
FIG. 2
FIG. 3

DISPLAY OPTIMIZATION FOR NIGHT VISION ENHANCEMENT SYSTEMS

BACKGROUND OF THE INVENTION

1. Field of the Invention

The subject invention relates to night vision systems and, more particularly, to a method and apparatus for optimizing display size and performance in such systems.

2. Description of Related Art

Night vision systems have recently been designed for use in connection with passenger vehicles and marine vessels. Such systems are disclosed, for example, in U.S. patent applications Ser. Nos. 08/226,728, filed Apr. 12, 1994 (Atty. Dkt. No. PD-94072) and the continuation-in-part thereof Ser. Nos. 08/304,981 filed Sep. 13, 1994 (Atty. Dkt. No. PD-94058), entitled "LOW COST NIGHT VISION ENHANCEMENT SYSTEM FOR MOBILE LAW ENFORCEMENT APPLICATIONS" and "LOW COST NIGHT VISION SYSTEM FOR MOBILE LAW ENFORCEMENT AND MARINE APPLICATIONS," the disclosure of such applications being incorporated by reference herein. Such systems employ an externally-mounted night vision sensor (infrared camera) and a display, which is typically mounted within the vehicle or marine vessel for displaying the external scene to the operator of the vehicle or vessel.

Prior to the subject invention, vehicles modified for night vision enhancement have utilized a standard 4:3 aspect ratio display, regardless of the sensor (camera) field of view. Such a fixed field of view has several drawbacks. In general, the display provides excess information which may confuse the driver. Depth perception may be skewed with the result that the driver cannot judge distances, for example, the distance to a vehicle being followed. Such problems are particularly acute in applications where the system magnification is less than 1, a condition which is desirable to reduce display size to the size required to fit typical automobile and other applications.

OBJECTS AND SUMMARY OF THE INVENTION

Accordingly, it is an object of the invention to improve night vision systems;

It is another object of the invention to improve displays used in conjunction with night vision systems;

It is another object of the invention to provide a night vision system display with improved depth perception; and It is another object of the invention to provide a night vision system display with improved information conveying capabilities.

According to the invention, a night vision system display is provided wherein the display and sensor field of views are optimized for night vision enhancement. A relationship is established according to the invention between the selected sensor field of view and the display aspect ratio implemented in response to that selection for a particular location of the sensor on the vehicle. According to this relationship, the display aspect ratio decreases as the selected field of view narrows so as to provide only as much information as the operator or driver normally sees out of the windshield with the naked eye. Thus, the vertical field of view of the display subtended at the driver's eye is selected to present only useful information to the driver, and the road area directly in front of the vehicle, for example, is eliminated from the field of view, since it provides no useful information and, in fact, can distract the eye due to the high rate of motion. Depth perception is improved, since excess vertical information in the display, which distorts the driver's depth perception, is also eliminated. The amount of time required by the driver to assimilate the information provided in the display is also reduced, further improving assimilation of the display by the driver.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 2 is a schematic diagram illustrating an optical system according to the preferred embodiment; and FIG. 3 is a perspective view illustrating an optimized display panel according to the preferred embodiment.

DETAILED DESCRIPTION OF THE PREFERRED EMBODIMENTS

Figure 1:
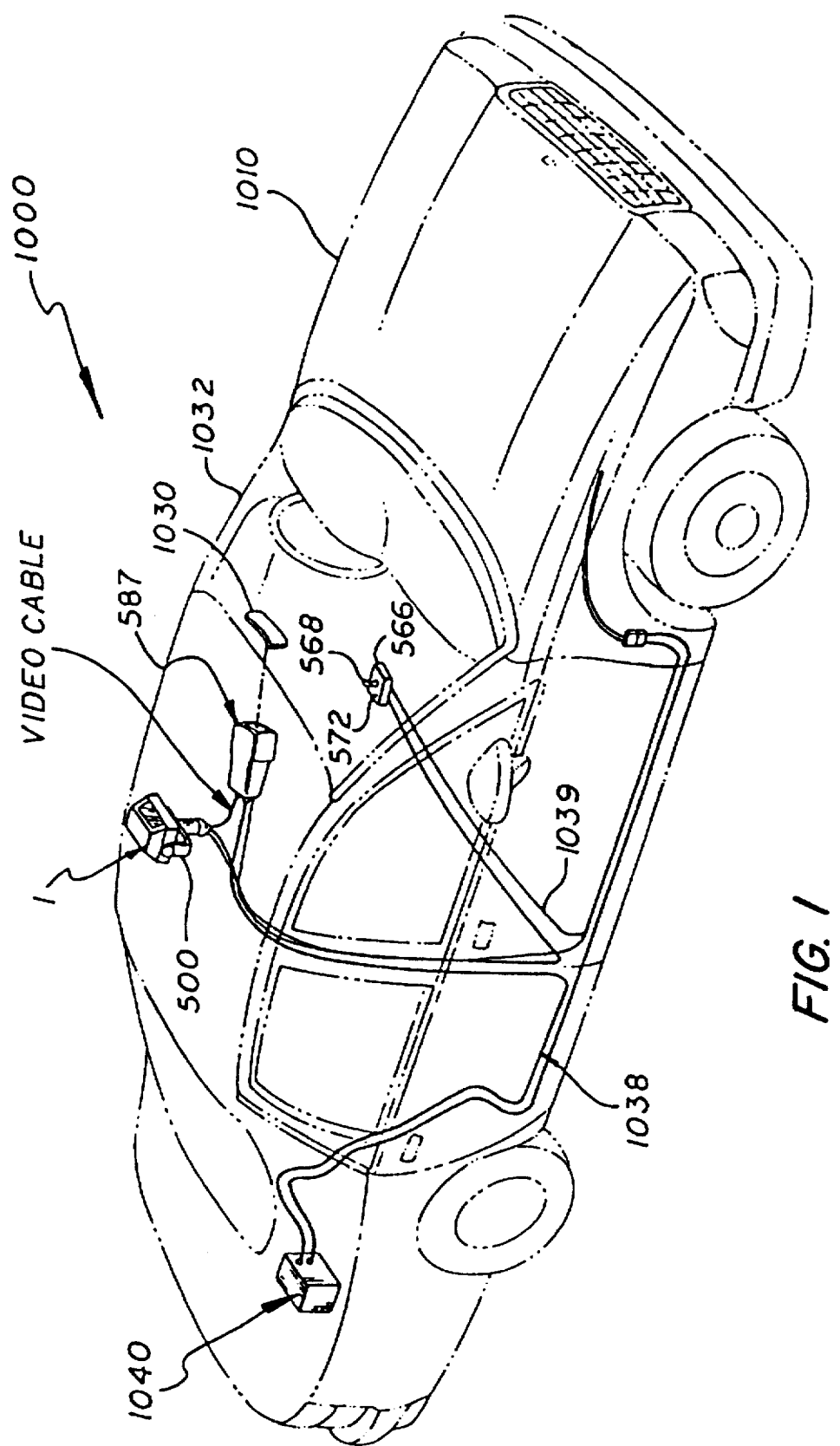
FIG. 1 is a schematic perspective view illustrating a night vision enhancement system wherein the preferred embodiment finds application.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide readily manufacturable and implemented commercial embodiments.

FIG. 1 is a schematic diagram illustrating an illustrative installation of a low cost night vision enhancement system in a public safety vehicle (shown in phantom). The system 1000 includes a night vision camera 1 mounted in a pointing mechanism 500 on top of a public safety vehicle 1010 (shown in phantom). The night vision camera 1 and the pointing mechanism 500 are secured to the top of the vehicle 1010 by suitable mounting hardware 1012 (not shown).

As further shown in FIG. 1, the night vision camera 1 is connected to a display unit which, in the illustrative embodiment, may implemented as a "Datavision" head-up display (HUD) available from Hughes Aircraft Company. The Datavision HUD includes a projector 587, a combiner 1030, display electronics 1040 located in the trunk, and data harness and power harness cables 1038, 1039. The combiner 1030 is mounted on the windshield 1032 (shown in phantom) of the vehicle 1010 for displaying a real image from the projector 587. The cables 1038, 1039 are shielded and are stowed in suitable mounting brackets.

The video display is not limited to a Datavision HUD. Alternatively, an active matrix liquid crystal display (LCD) mounted on the dashboard of the vehicle can be used to display the real image from the camera. Active matrix LCDs are available from Citizen, Sharp, and Toshiba, to name a few.

Instead of displaying a real image, the video display can display a virtual image. The virtual image can be displayed by "Virtual Image Glasses" available from Virtual Vision in Redmond, Wash. The Virtual Image Glasses project a TV-like, wide screen image in front of the bumper of the vehicle. An officer wears the Glasses to view the scene ahead. Data is transmitted either through hard-wired connections or wireless (e.g., spread spectrum) transmission from the camera to the Glasses. Instead of the Glasses, a helmet-mounted visor can be used to project the TV-like, wide screen image in front the bumper of the vehicle.

Alternatively, a virtual image can be displayed directly on the vehicle windshield by the virtual display disclosed and claimed in U.S. patent application Ser. No. 07/971,799, entitled VIRTUAL IMAGE INSTRUMENT PANEL DISPLAY and assigned to the assignee of the present invention. This system, which includes mirrors and an active matrix LCD as a source, can be installed at the vehicle manufacturer, or it can be installed as an aftermarket add-on.

The system 1000 is controlled by a remote control unit 566 mounted inside the vehicle 1010. In the preferred embodiment, the remote control unit 566 is implemented with a joystick 568 and a plurality of switches 572. The camera 1, remote control 566 and the projection unit are inter-connected by the data harness cable 1038 and a power harness cable 1039 to display electronics 1040 located in the trunk of the vehicle 1010. Further details of the vision enhancement system 2 may be had by reference to the aforementioned U.S. patent applications, herein incorporated by reference.

FIG. 2 schematically illustrates an optical system 13 employing an infrared sensor 11, such as camera 1 used in the night vision enhancement system of FIG. 1. The optical system 13 focuses equally-spaced points 15 along a roadway 17 onto a focal plane array 19. As disclosed in the aforementioned patent applications, the focal plane array 19 may be an array of uncooled detectors from which an image is ultimately supplied via suitable cables 21 to a display 23.

The optical system 13 of FIG. 2 is a wide-angle optical system, i.e., one that includes both near and far field points out in front of the vehicle 1010. In such a system, equally-spaced points in object space are nonlinearly distributed on the focal plane array 19. This nonlinear distribution of chief optical rays creates a misjudgment of distance in the driver's mind. Analyzing the system of FIG. 2, one sees that, as the sensor field of view narrows in the horizontal dimension, the display aspect ratio must decrease to present the same amount of vertical information to the driver (i.e., a constant vertical field angle). Thus, in a series of photographs of the same vehicle with varying lens angles, judging how far away the vehicle is becomes progressively more difficult as the lens angle becomes wider and wider. There is so much extraneous information in the scene that the observer loses the ability to relate the displayed image to the real world. In addition, although the size of the vehicle becomes progressively smaller as the lens angle widens, the driver sees basically the same relative "distance" in each view. The foregoing assumes the size of a vehicle is relatively known to any driver.

The foregoing analysis demonstrates the inherent relationship between sensor and display fields of view. This relationship is quantified empirically in the following table, where "HFOV" indicates horizontal field of view:

TABLE I

| SENSOR HFOV (DEGREES) | OPTIMUM DISPLAY ASPECT RATIO (HORIZONTAL TO VERTICAL) |
|---|---|
| 58 | 5:2 |
| 33 | 4:2 |

TABLE I-continued

| SENSOR HFOV (DEGREES) | OPTIMUM DISPLAY ASPECT RATIO (HORIZONTAL TO VERTICAL) |
|---|---|
| 27 | 5:3 |
| 16 | 4:3 |

All aspect ratios given in Table I are for an 8.5-inch horizontal width display viewed at approximately 30 inches with the camera/sensor mounted on the roof of a vehicle, as shown in FIG. 1. Once the display aspect ratio is optimized for depth perception, the system designer can be assured that the absolute minimum amount of displayed information has been presented to the driver. Such optimization reduces to displaying only as much information as the driver normally sees through the windshield with the naked eye.

It is also considered desirable by the inventor to minimize the number of eye fixations required to view the display 23. It is known in the art of designing and integrating avionics displays into aircraft that the number of eye fixations required to assimilate information from a display is directly proportional to angular area. A good rule of thumb is that one eye fixation is composed of up to three fine eye movements or saccades, and that each saccade provides useful information over a five-degree angular (circular) area. Thus, minimizing the number of eye fixations is desirable for safety and efficiency in a display for aircraft, automobiles, trucks, recreational vehicles, or any other form of moving apparatus. The preferred embodiment minimizes the number of eye fixations by minimizing the amount of displayed information the viewer must deal with.

Also, the importance of the overall system magnification between an object in the real world and an object as viewed on the display should be noted. The system magnification may be computed as follows:

$$\text{system mag} = \frac{\theta_O}{\theta_D}$$

where $\theta_O$=angular subtense of feature in object space $\theta_D$=Angular subtense of feature as viewed on display at the driver's eye position $$\theta_D = 2 \tan^{-1}\left(\frac{A/2}{B}\right)$$

where

A=linear dimension of displayed feature, inches

B=distance of eye to display, inches

Given the above relationships, it is noted that a system magnification which is less than 1 creates a problem in judging depth in the display 23. If the system magnification were always held to the value "1," the field of view of the sensor 11 would not matter. This, however, requires a very large display 23 for wide field angles in the sensor 11. Since a large display is impractical to package in many vehicles, the relationships described herein become very useful when a wide field angle is desired for the horizontal field of view of the sensor 11.

In a particularly preferred embodiment constructed according to the invention, the field of view of the sensor 11 is 27 degrees horizontal and 9 degrees vertical. With a mean distance 22 from the display 23 to the driver's eye 24 of 30 inches and an image magnification of 0.5:1, the display aspect ratio is selected at 3:1, resulting in a display 23 which is 7.2 inches in width (horizontal) and 2.4 inches high (vertical), as shown in FIG. 3. The display 23 is placed directly in front of the driver, in place of the normal automobile instrument panel cluster, although this is by no means the only possible location for the display 23.

The above teachings are thought to apply to all forms of displays possible in a vehicle. Flat panels, CRTs, projected or direct view, may be implemented in this fashion, regardless of display location in the vehicle. Any empirically-derived relationship between aspect ratio and sensor or camera field of view (if the camera is visible) will change to some degree as the sensor or camera perspective with respect to the driving "scene" in front of the vehicle changes. A general formula has not been derived to date, though one could readily be derived geometrically with applied trigonometry. The important consideration in the selection of display aspect ratio (in this case 3:1) is to avoid overwhelming the driver with extraneous information in the vertical field. Therefore, the wider the horizontal field of view of the sensor is, the narrower the display vertical dimension becomes.

A 9-degree vertical field of view is optimal in the preferred embodiment, as determined through empirical testing. In preferred installation, a particular objective was to reduce the amount of time the driver's eyes were off the view through the windshield and on the displayed image.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of optimizing the scene presented to a viewer by a system employing a sensor including a wide angle optical system and a visual display comprising the steps of:

arranging said sensor to have a field of view of a selected horizontal dimension; and selecting a physical ratio for said display based on said horizontal dimension.

2. The method of claim 1 wherein said sensor is mounted above a windshield and said display aspect ratio is selected according to a relationship whereby said display aspect ratio decreases as said horizontal dimension narrows so as to provide only as much information as a viewer sees out of the windshield with the naked eye.

3. The method of claim 2 further including the step of selecting the vertical field of view of said sensor to be 9 degrees.

4. The method of claim 3 further including the step of selecting the horizontal field of view of said sensor to be 27 degrees.

5. The method of claim 4 further including the step of selecting the mean distance from the display to the viewer's eye to be 30 inches, the system image magnification to be 0.5:1, and the display aspect ratio to be 3:1.

6. The method of claim 2 further including the step of selecting the physical aspect ratio of the display (horizontal to vertical)

based upon the horizontal field of view (HFOV) such that,
        if the HFOV is 58 degrees, the display aspect ratio is 5:2;
        if the HFOV is 33 degrees, the display aspect ratio is 4:2;
        if the HFOV is 27 degrees, the display aspect ratio is 5:3; and
        if the HFOV is 16 degrees, the display aspect ratio is 4:3.

7. Apparatus comprising:

a night vision sensor having a selected horizontal and vertical field of view; and a display means positioned for displaying an image to a viewer, the image being detected by said sensor, said display means having a length and width and a display physical ratio optimized based upon the horizontal dimension of said field of view.

8. The apparatus of claim 7 wherein the vertical field of view of said sensor is 9 degrees.

9. The apparatus of claim 8 wherein the horizontal field of view of said sensor is 27 degrees.

10. The apparatus of claim 9 wherein the mean distance from the display to the viewer's eye is 30 inches, the image magnification is 0.5:1, and said display aspect ratio is 3:1.

11. The apparatus of claim 7 wherein the physical aspect ratio (horizontal to vertical) of the display is selected based upon the horizontal field of view (HFOV) such that,
        if the HFOV is 58 degrees, the display aspect ratio is 5:2;
        if the HFOV is 33 degrees, the display aspect ratio is 4:2;
        if the HFOV is 27 degrees, the display aspect ratio is 5:3; and
        if the HFOV is 16 degrees, the display aspect ratio is 4:3.

12. The apparatus of claim 7 wherein said sensor is an infrared sensor.

13. A method of determining optimum physical horizontal and vertical dimensions of a display for use with a vision system, the vision system including a sensor having a predetermined horizontal field of view, the method comprising the step of:

determining a ratio of a horizontal and a vertical dimension of said display based upon the predetermined horizontal field of view of the sensor, wherein the ratio is determined according to a relationship whereby the wider the predetermined horizontal field of view of the sensor, the narrower the display's physical vertical dimension.

* * * * *